United States Patent [19]

Evans

[11] Patent Number: 4,533,009

[45] Date of Patent: Aug. 6, 1985

[54] LIFTING AND TRANSPORTING DEVICES

[76] Inventor: David L. Evans, Hazeldene Cottage, Ford Rd., Litton, Nr. Bath, Somerset, England

[21] Appl. No.: 596,913

[22] Filed: Apr. 5, 1984

[51] Int. Cl.³ .................... G01G 19/08; G01G 23/02
[52] U.S. Cl. .................................... 177/139; 177/140; 177/153
[58] Field of Search ............... 177/139, 140, 147, 148, 177/151-153

[56] References Cited

U.S. PATENT DOCUMENTS

| 995,131 | 6/1911 | Graves | 177/139 |
| 3,998,284 | 12/1976 | James | 177/140 X |

FOREIGN PATENT DOCUMENTS 1252421 11/1971 United Kingdom ............... 177/140

Primary Examiner—George H. Miller, Jr.
Attorney, Agent, or Firm—Banner, Birch, McKie & Beckett

[57] ABSTRACT

A device is provided with weighing apparatus mounted on the movable upper frame and means operable automatically in response to raising of the upper frame beyond its normal transport position to divert the weight of the drum from the base frame onto the weighing apparatus. Said means comprises a rotary catch which is mounted on the base frame and is automatically operable to engage first beneath the upper frame and then beneath a load-sensitive bar of the weighing apparatus in response to successive upward movements of the upper frame to and beyond its transport position and load-engaging members mounted on and slidable relative to the upper frame, which members are automatically operable through the medium of cams on the base frame and a pivoted flap on the upper frame to connect the load to and disconnect it from the base frame when the upper frame reaches its transport and weighing positions respectively.

7 Claims, 7 Drawing Figures

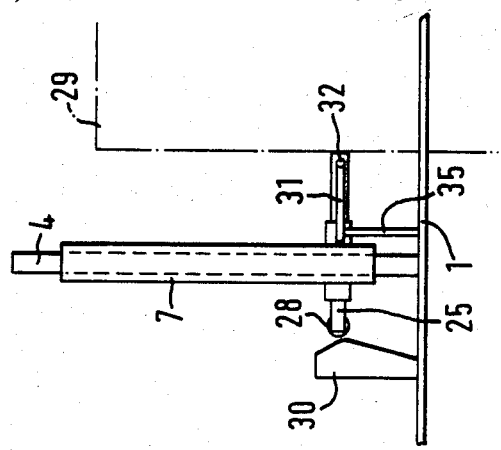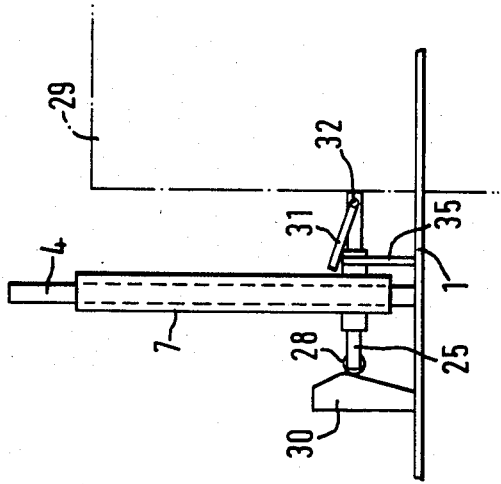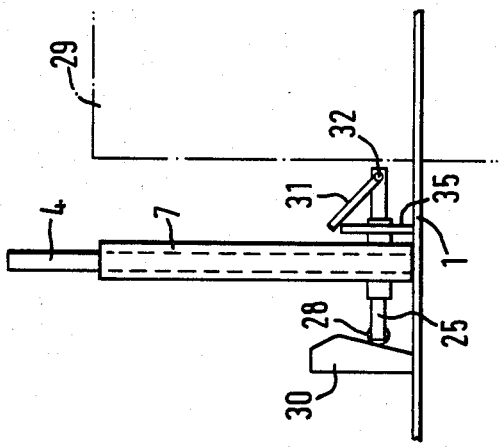

LIFTING AND TRANSPORTING DEVICES

BACKGROUND OF THE INVENTION

This invention relates to devices for lifting and transporting heavy objects and is particularly concerned with such devices of the kind described in British Pat. Nos. 1297382 and 2069454 and comprising a base frame having around wheels, an upper frame slidable vertically on said base frame and provided with means for clamping an object thereto, a manually operable lever pivotally mounted on said base frame for movement about a horizontal axis to raise said upper frame and releasable means for locking said upper frame in its raised position.

The releasable locking means usually comprises a catch rotatably mounted on the upper frame and an abutment mounted on the base frame and operable, in response to upward movement of the upper frame relative to the base frame, to rotate the catch into locking engagement with a shoulder on the base frame.

SUMMARY OF THE INVENTION

It is a principal object of the present invention to provide a device of the kind described which is capable of weighing a container carried thereby and to this end, according to the invention, the upper and base frame are provided with cooperating means which operate automatically in response to upward movement of the upper frame into a first or transport position to retain the upper frame in that position with the weight of the container transmitted directly to the base frame and which operate automatically in response to further upward movement of the upper frame beyond said first position into a second or weighing position, to divert the entire weight of the container through weighing mechanism mounted on said upper frame.

BRIEF DESCRIPTION OF THE DRAWINGS

One embodiment of the invention will be described, by way of example, with reference to the accompanying drawings which show a wheeled device for lifting, transporting and weighing oil drums and like rimmed containers and in which:

FIGS. 5 to 7 are diagrammatic side views showing three positions of the lower drum-engaging members and the pivotal support flap.

DETAILED DESCRIPTION OF THE PREFERRED EMBODIMENT

Figure 1:
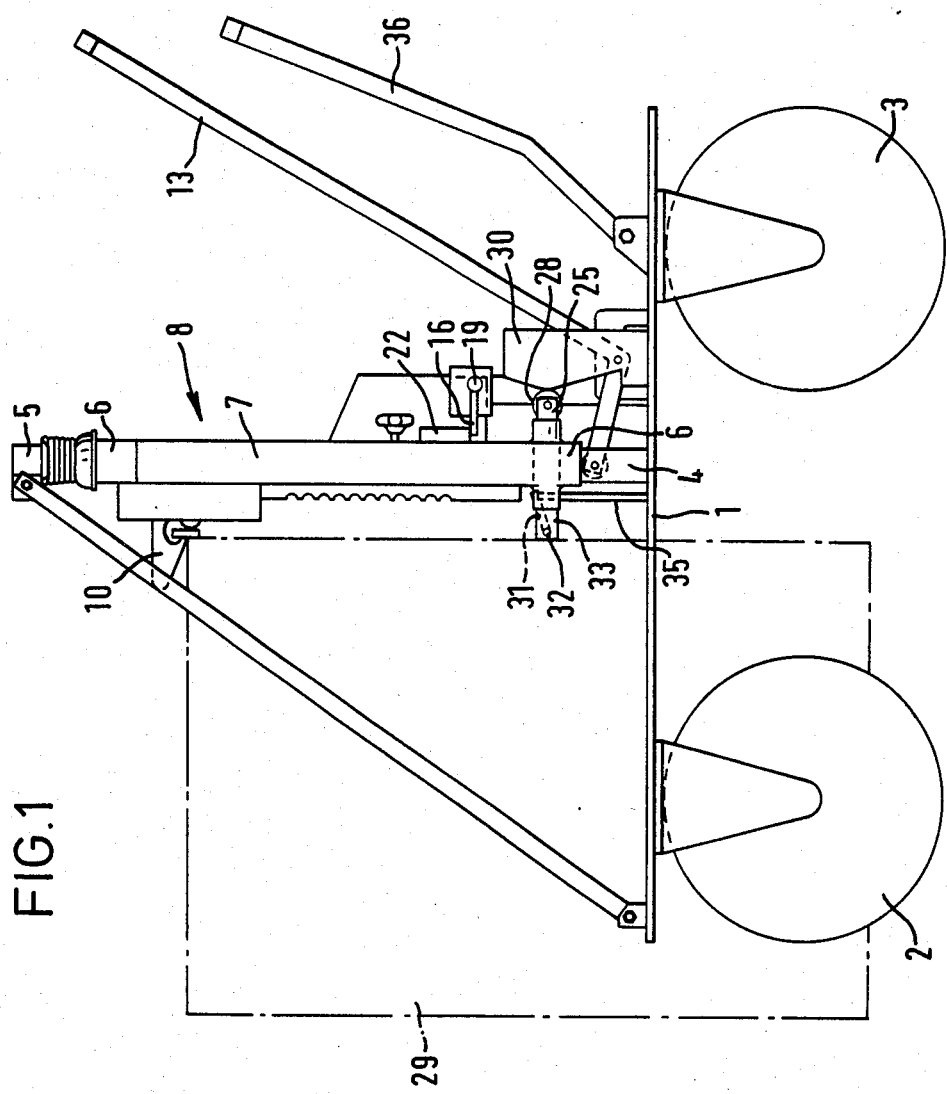
FIG. 1 is a diagrammatic side elevation of the device showing the upper frame in its transport position with a drum gripped thereby.
Figure 2:
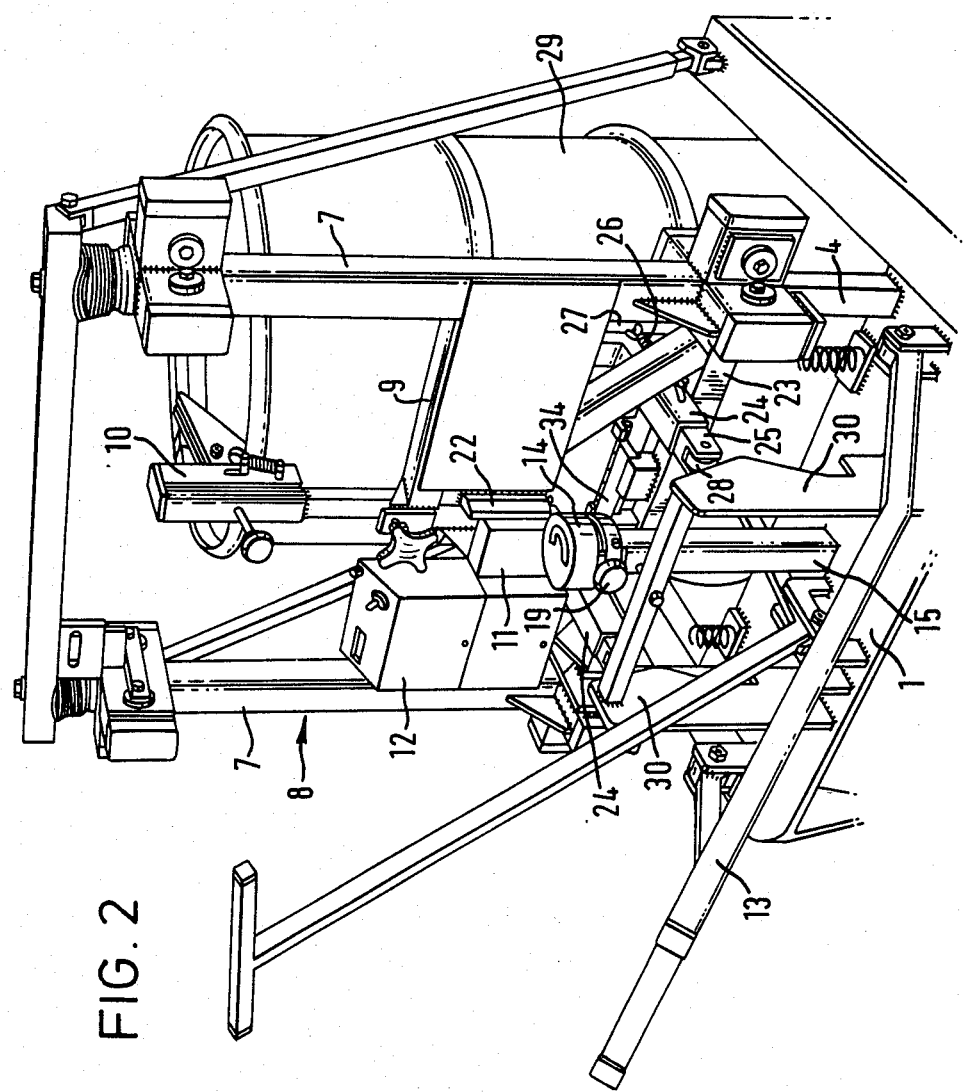
FIG. 2 is a rear perspective view of the device of FIG. 1 with a part of the base frame and wheels omitted.

As shown in the drawings, a base frame 1, mounted on two fixed front wheels 2 and a steerable rear wheel 3 is provided with upright members 4 connected together at their upper ends by a cross-member 5. Slidably mounted on the members 4, through the medium of upper and lower bearings 6 to minimise friction, are tubular members 7 of an upper frame 8. The members 7 are connected, intermediate their ends, by a cross-member 9 which supports a clamping device 10 of the kind described in British Patent Specification No. 2069454 for gripping the rim of a drum. The cross-member 9 also carries weighing mechanism in the form of a weight sensing bar 11 mechanically linked to a strain gauge which is adapted to transmit a signal equivalent to the weight sensed by the bar 11 to an electronic read-out unit 12.

Raising and lowering of the frame 8 on the base frame members 4 is effected by pivotal movement of a hand-lever 13 in the manner described in Patent Specification No. 2069454.

In order to retain the upper frame 8 in its raised position a catch assembly, shown generally at 14, is mounted on the upper end of a fixed column 15 extending upwardly from the base frame 1. The catch assembly 14 comprises a catch member 16 rotatable about a vertical axis 17 and connected by a tension spring 18 to a manually operable knob 19 rotatable about the axis 17 between fixed stops 20 and 21 to provide over-centre adjustment of the spring between the positions shown in FIGS. 3 and 4. In the position of the knob 19 shown in FIG. 3, the spring 18 biasses the catch member 16 in a clockwise direction away from a support bar 22 carried by the cross-member 9, whereas in the position of the knob shown in FIG. 4, the spring biasses the catch member in an anti-clockwise direction towards the support bar 22 and the weight sensing bar 11.

Below the cross-member 9 the frame members 7 are bridged by a further cross-member 23 which carries guides 24 for a pair of push-rods 25 which are biassed in rearward direction by springs 26 and provided at their forward and rear ends with pads 27 and rollers 28 respectively for engagement with a drum 29 to be transported and a pair of cams 30 fixed to the base frame respectively. A flap 31, is pivotally mounted at 32 in blocks 33 carried by a cross-member 34 bridging the push rods 25 and the free end of the flap rests on the upper ends of two supporting bars 35 fixed to the base frame 1.

Figure 3:
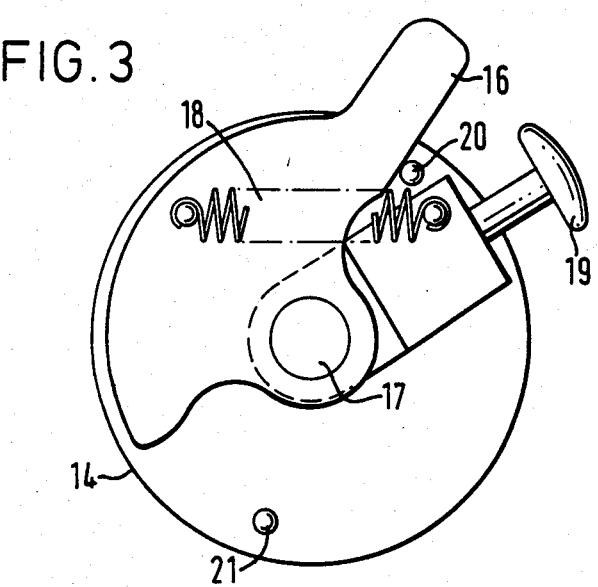
FIGS. 3 and 4 are diagrammatic plan views on an enlarged scale of a catch with its cover removed to show its two positions of adjustment.
Figure 4:
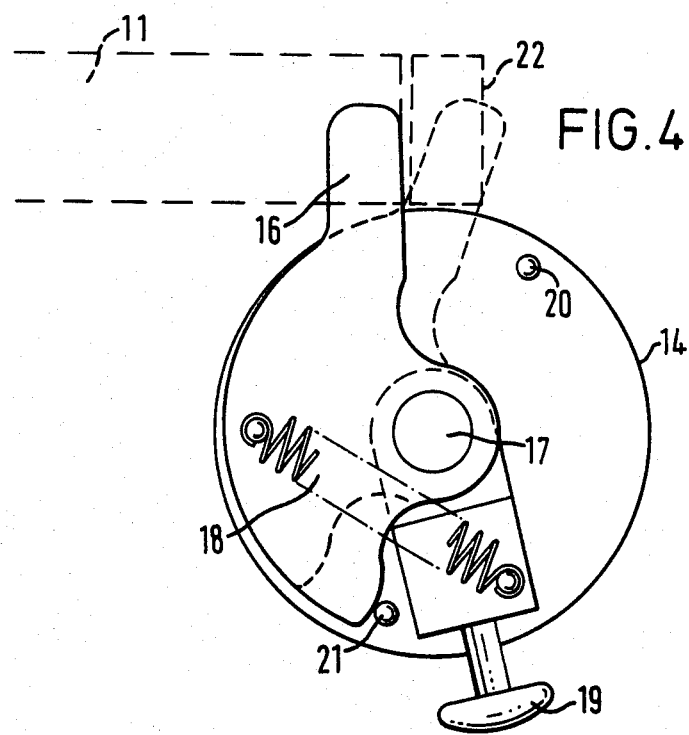

With the frame 8 in its lowermost position and the knob 19 of the catch assembly in the position shown in FIG. 3, the device is wheeled towards a drum 29 until the clamping device 10 engages over the rim of the drum. The knob 19 of the catch assembly is then moved into the position shown in FIG. 4 in which the catch member 16 engages one side of the support bar 22 and the frame 8 with the drum is then lifted by operation of the hand lever 13 until the lower end of the bar 22 passes beyond the catch member which is thereupon moved by the spring 18 into the position shown in broken lines in FIG. 4, where it engages beneath the bar. During this upward movement of the frame 8 the rollers 28 on the push rods 25 ride up the cams 30 causing the push rods to move forward into a drum transporting position in which the pads 27 thereon firmly engage the drum and the angle between the flap 31 and the axes of the push rods has been greatly reduced. In this drum-transporting position the weight of the drum is transmitted through the push rods 25 and the cams 30 to the base frame 1. The hand-lever can then be returned to its starting position and the device wheeled with the aid of a steering handle 36, to the point at which the drum is to be unloaded. Whenever it is required to weigh the drum carried by the device, the hand-lever 13 merely has to be moved further in the lifting direction to continue raising the frame 8 until the catch member 16 engages beneath the weight-sensing bar 11. During this additional upward movement of the frame 8 the rollers 28 on the push rods 25 ride past the widest portions of the cams 30 and the flap 31 assumes a horizontal position in which its free end engages the cross-member 23 and prevents rearward movement of the push rods and thus continuing engagement of the cams by the rollers. The weight of the drum is then borne entirely by the frame 8 which acts on the catch through the sensing bar 11. The weight of the drum 29 and its contents are indicated by the read-out unit 12 and the lever 13 is again operated to return the upper frame 8 and the push rods 25 and the flap 31 to the transport position so that the weight of the drum is once more supported by the base frame 1 while being wheeled to the unloading point. Upon reaching the unloading point, the hand-lever 13 is again operated to lift the upper frame 8 off the catch 14 which is then rotated to its other extreme position in which the catch member 16 is out of the path of the upper frame member 22. The hand-lever 13 is then moved in the opposite direction to lower the upper frame 8 and disengage the push rods 25 from the drum 29 to enable the latter to be lowered to the ground, where the pressure on the claws of the clamping device 10 is relieved to release the rim of the drum.

I claim:

1. A device for lifting and transporting heavy objects, comprising a base frame having ground wheels, an upper frame slidable vertically on said base frame and provided with means for clamping an object thereto, a manually operable lever pivotally mounted on said base frame for movement about a horizontal axis to raise said upper frame, and releasable means for locking said upper frame in its raised position, characterised in that the upper and base frames are provided with cooperating means operable automatically in response to upward movement of the upper frame into a first or transport position, to retain the upper frame in that position with the weight of the container transmitted directly to the base frame, and operable automatically in response to further upward movement of the upper frame beyond said first position into a second or weighing position to divert the entire weight of the container through weighing mechanism mounted on said upper frame.

2. A device according to claim 1, wherein said cooperating means include a catch mounted on the base frame and rotatable, in response to upward movement of the upper frame, into said first position, to engage beneath and support the upper frame during transport, and rotatable further, in response to said further upward movement of the upper frame into said second position, to engage beneath a load-sensing element of said weighing mechanism.

3. A device according to claim 2, wherein said catch comprises a rotatable catch member acted upon by an over-centre spring which is manually adjustable between a first position in which it biasses said catch member towards said upper frame and said load-sensing element and a second position in which it biasses said catch member out of engagement with said upper frame and load-sensing element.

4. A device according to claim 1, wherein said cooperating means includes a first element on said upper frame which is automatically operable, in response to upward movement of said upper frame, into said first position, to connect and transmit the weight of said drum to said base frame and a second element on said upper frame which is automatically operable in response to said further upward movement of said upper frame into said second position to disconnect said first element from said base frame.

5. A device according to claim 4, wherein said first element is a push-rod slidable endwise relative to said upper frame and spring-biassed into engagement with a fixed cam on said base frame operative upon upward movement of said upper frame into its first position to urge said rod into pressure engagement with the drum and said second element is a flap pivotally mounted on said upper frame and operable in response to said further upward movement of said upper frame into said second position to hold said push rod out of pressure engagement with said cam against the action of said biassing spring.

6. A device according to claim 5, wherein said first element comprises two spring-biassed push rods secured together in spaced relation by a cross-member forming a pivotal mounting for said flap and acted upon by two cams fixed to said base frame.

7. A device according to claim 1, wherein said load-sensing element is mechanically connected to a strain gauge which is electrically connected to an electronic read-out unit mounted on said upper frame.

* * * * *